(12) United States Patent
Wang et al.

(10) Patent No.: US 12,523,638 B2
(45) Date of Patent: Jan. 13, 2026

(54) METHOD FOR RAPIDLY DETECTING PESTICIDE BASED ON THIN-LAYER CHROMATOGRAPHY AND ENZYME INHIBITION PRINCIPLE

(71) Applicant: INSTITUTE OF QUALITY STANDARD AND TESTING TECHNOLOGY FOR AGRO-PRODUCTS, CAAS, Beijing (CN)

(72) Inventors: Miao Wang, Beijing (CN); Jing Wang, Beijing (CN); Yunling Shao, Beijing (CN); Yongxin She, Beijing (CN); Maojun Jin, Beijing (CN); Zhen Cao, Beijing (CN); Shanshan Wang, Beijing (CN); Lufei Zheng, Beijing (CN); Hua Shao, Beijing (CN); Fen Jin, Beijing (CN)

(73) Assignee: INSTITUTE OF QUALITY STANDARD AND TESTING TECHNOLOGY FOR AGRO-PRODUCTS, CAAS, Beijing (CN)

( * ) Notice: Subject to any disclaimer, the term of this patent is extended or adjusted under 35 U.S.C. 154(b) by 320 days.

(21) Appl. No.: 18/224,984

(22) Filed: Jul. 21, 2023

(65) Prior Publication Data
US 2024/0110900 A1  Apr. 4, 2024

(30) Foreign Application Priority Data
Sep. 29, 2022 (CN) .......................... 202211199229.3

(51) Int. Cl.
*G01N 30/91* (2006.01)
*C12Q 1/46* (2006.01)
*G01N 30/94* (2006.01)

(52) U.S. Cl.
CPC ............... *G01N 30/91* (2013.01); *C12Q 1/46* (2013.01); *G01N 30/94* (2013.01); *G01N 2333/918* (2013.01)

(58) Field of Classification Search
CPC .................................. C12Q 1/46; G01N 21/78
See application file for complete search history.

(56) References Cited

FOREIGN PATENT DOCUMENTS

CN         111721761 A        9/2020

OTHER PUBLICATIONS

Shao, Yunling, et al. "A method for the rapid determination of pesticides coupling thin-layer chromatography and enzyme inhibition principles." Food chemistry 416 (2023): 135822. (Year: 2023).*
CNIPA First Office Action in CN Application No. 202211199229.3 dated Jan. 31, 2023 (8 pages, including English translation).
CNIPA Notification to Grant Patent Right for Invention in CN Application No. 202211199229.3 dated Mar. 31, 2023 (3 pages, including English translation).

* cited by examiner

*Primary Examiner* — Robert J Yamasaki
(74) *Attorney, Agent, or Firm* — BROOKS KUSHMAN P.C.

(57) ABSTRACT

A method for rapidly detecting pesticides based on thin-layer chromatography (TLC) and enzyme inhibition principles. The method includes the following steps: cutting a TLC plate into a rectangle, and using one end of the rectangle to contact a sample extract to form a pesticide residue separation area; covering the other end of the rectangle with a small piece cut from filter paper or glass fiber and fixing on a piece of enzyme inhibition reaction test paper to form a pesticide enrichment area; pasting a side of the enzyme inhibition reaction test paper away from the pesticide residue separation area with a piece of filter paper immobilized with a chromogenic agent to form a substrate color development area; and performing color reaction.

3 Claims, 2 Drawing Sheets

METHOD FOR RAPIDLY DETECTING PESTICIDE BASED ON THIN-LAYER CHROMATOGRAPHY AND ENZYME INHIBITION PRINCIPLE

CROSS-REFERENCE TO RELATED APPLICATION

This application claims foreign priority benefits under 35 U.S.C. § 119 (a)-(d) to Chinese Patent Application No. 202211199229.3 filed on Sep. 29, 2022, which is hereby incorporated herein by reference in its entirety.

TECHNICAL FIELD

The present disclosure belongs to the technical field of pesticide detection, and in particular relates to a method for rapidly detecting pesticides based on thin-layer chromatography (TLC) and enzyme inhibition principles.

BACKGROUND

Organophosphorus and carbamate pesticides are highly toxic pesticides still used in agricultural production at present, and residues thereof in edible agricultural products have posed a serious risk to consumers' health.

At present, the mainstream rapid detection method for the above two types of pesticides is the enzyme inhibition method. The main principle is as follows: cholinesterase and the like can catalyze the hydrolysis of specific substrates to develop color or generate fluorescence or electrochemical signals, while highly toxic pesticides can inhibit the enzyme activity and influence the occurrence of the above reactions, so that the type and content of pesticides can be determined through changes in optical or electrochemical signals. However, in this method, aqueous buffers including phosphate buffered saline (PBS) or Tris-HCl are mostly used in the reaction system to ensure the normal conduct of the enzymatic reaction, but the aqueous buffers can only extract part of the pesticides on the surface of agricultural products, leading to insufficient extraction efficiency.

The canonical pretreatment methods for pesticide residues mostly use organic solvents for extraction to ensure the extraction efficiency of pesticides in samples. For example, the canonical quick, easy, cheap, effective, rugged and safe (QuEChERS) rapid sample pretreatment technology uses acetonitrile or methanol as the final extraction solvent. However, organic solvents have a significant impact on the activity of biological recognition elements including enzymes.

The contradiction between the above-mentioned pretreatment solvent system and the enzyme inhibition reaction solution system leads to serious false positivity and false negativity in the detection of pesticides by the enzyme inhibition method. This restricts the use of this method and poses hidden dangers to food safety. In order to solve this problem, Chinese present CN202010505846.6 discloses an enzyme inhibition rapid detection card suitable for detecting pesticide residues in an organic solvent extraction sample, an independent sample introduction card and a use method thereof. The enzyme inhibition rapid detection card is composed of a sample introduction card, an enzyme zone card and a substrate card. According to the enzyme inhibition rapid test card, the sample introduction zone card is additionally arranged; the super-large specific surface area of a paper material is utilized, on-line volatilization of an organic solvent in the sample introduction zone is accelerated, and enzyme inhibition and color reaction are sequentially carried out through folding, fitting and the like after the organic solvent is volatilized. The dual requirements of combination of the sample organic phase pretreatment and the enzyme inhibition method and zero contact of the organic solvent and immobilized enzyme are met, and the detection sensitivity and accuracy of the enzyme inhibition rapid detection card are improved. However, when detecting pesticide residues in agricultural products, the sample extract usually contains interfering substances like pigments, which will affect the accuracy of the detection results.

SUMMARY

Aiming at the above deficiencies in the prior art, the present disclosure provides a method for rapidly detecting pesticides based on TLC and enzyme inhibition principles. A new method for rapidly detecting organophosphorus and carbamate pesticides in agricultural products is established by combining TLC with enzyme inhibition.

To achieve the above objective, the present disclosure adopts the following technical solution:

A method for rapidly detecting pesticides based on TLC and enzyme inhibition principles is provided, including the following steps:
- step S1, cutting a TLC plate into a rectangle, and using one end of the rectangle to contact a sample extract to form a pesticide residue separation area; covering the other end of the rectangle with a small piece cut from filter paper or glass fiber and fixing on a piece of enzyme inhibition reaction test paper to form a pesticide enrichment area; and pasting a side of the enzyme inhibition reaction test paper away from the pesticide residue separation area with a piece of filter paper immobilized with a chromogenic agent to form a substrate color development area;
- step S2, adding 50 μL of an agricultural product sample extract into a sample tank, and inserting the pesticide residue separation area into the sample tank to perform TLC separation and development;
- step S3, migrating the sample extract to an upper end of the pesticide residue separation area with a developer, pulling out the pesticide residue separation area from the sample tank, laying the pesticide residue separation area flat, and air-drying the pesticide residue separation area for 1 min; and
- step S4, adding 25 μL of an enzymatic aqueous phase working solution dropwise to the pesticide enrichment area; after 30 s, folding the substrate color development area so that the substrate color development area overlaps with the pesticide enrichment area, pinching both areas tightly by hand for 1-3 min to perform color reaction, where in case of no pesticide in the sample extract, color development occurs in the substrate color development area, and a chromogenic product is absorbed by paper in the pesticide enrichment area; in case of an excessive pesticide in the sample extract, insufficient or no color development occurs in the substrate color development area, and no chromogenic product is enriched in the paper in the pesticide enrichment area, so that color changes can determine whether there is a pesticide in a sample.

Further, in step S1, a supporting medium of the TLC plate is selected from the group consisting of glass and metal foil.

Further, in step S2, the sample extract is prepared by a QuEChERS method, using acetonitrile or methanol as a solvent.

Further, in step S4, a piece of filter paper with an enzyme is fixed in advance in the pesticide enrichment area, and folded up with the substrate color development area.

The present disclosure has the following beneficial effects:

The method provided by the present disclosure overcomes a contradiction between organic solvent extraction and enzymatic reaction in an aqueous solution, reduces the interference of pigments and other substances in agricultural product samples, and increases the efficiency and accuracy of rapid detection of pesticide residues.

DETAILED DESCRIPTION

The specific embodiment of the present disclosure will be described below so that those skilled in the art can understand the present disclosure, but it should be clear that the present disclosure is not limited to the scope of the specific embodiment. For those of ordinary skill in the art, as long as various changes fall within the spirit and scope of the present disclosure defined and determined by the appended claims, these changes are apparent, and all inventions and creations using the concept of the present disclosure are protected.

EXAMPLE

Figure 1:
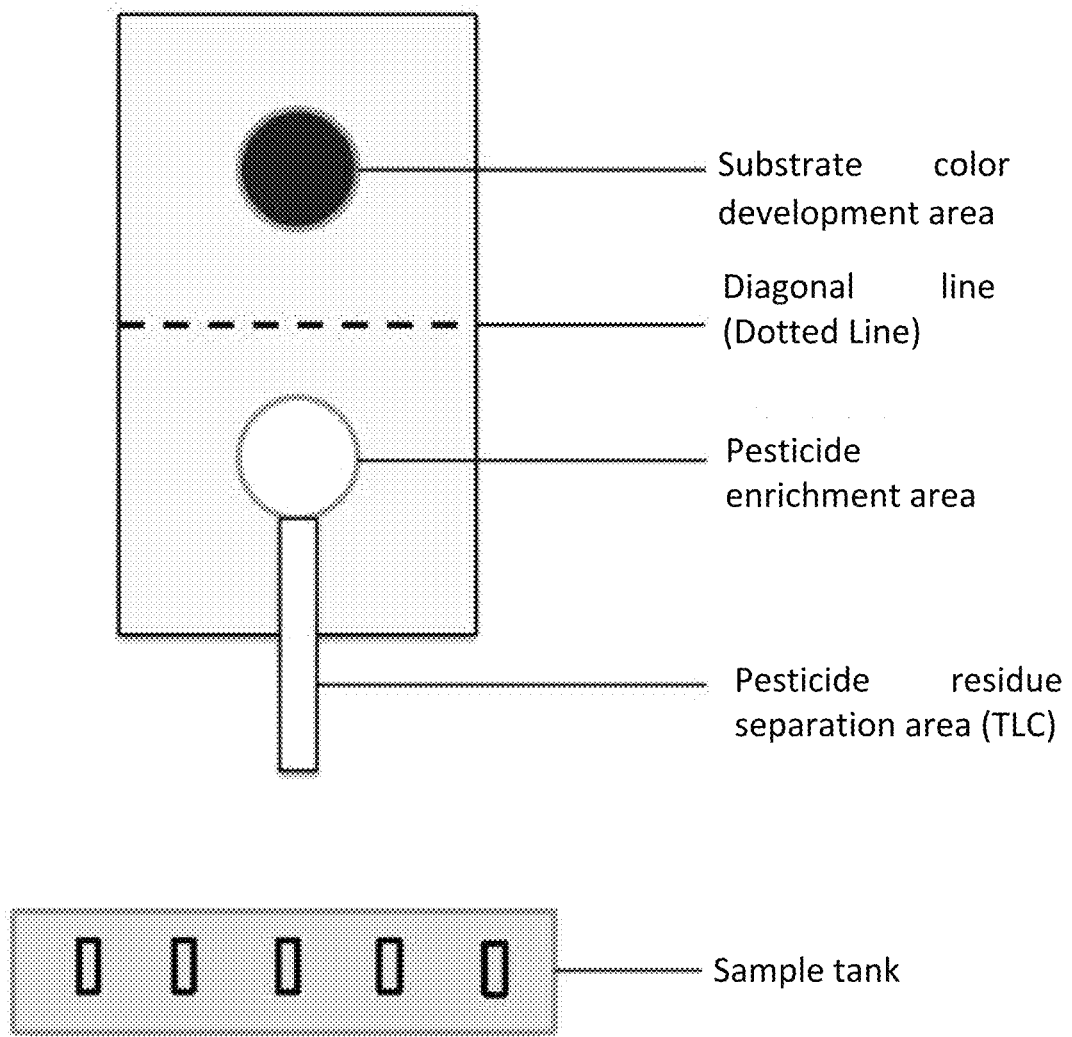
FIG. 1 is a schematic diagram showing a pesticide residue separation area, a pesticide enrichment area and a substrate color development area for detection by a method provided by the present disclosure.

A method for rapidly detecting pesticides based on TLC and enzyme inhibition principles was provided, including the following steps:

Step S1. A TLC plate (the supporting medium might be glass or metal foil) was cut into a rectangle, and one end of the rectangle was used to contact a sample extract to form a pesticide residue separation area; the other end of the rectangle was covered with a small piece cut from filter paper or glass fiber and fixed on a piece of enzyme inhibition reaction test paper to form a pesticide enrichment area; and a side of the enzyme inhibition reaction test paper away from the pesticide residue separation area was pasted with a piece of filter paper immobilized with a chromogenic agent to form a substrate color development area, as shown in FIG. 1.

Step S2. 50 µL of an agricultural product sample extract was added into a sample tank, and the pesticide residue separation area was inserted into the sample tank to perform TLC separation and development. Since the distribution ratio of organophosphorus and carbamate pesticides in the organic phase is relatively large, while the distribution ratio of pigments such as chlorophyll is relatively small, the effective separation of pesticides and interfering substances such as pigments in the sample matrix can be achieved.

Step S3. When the sample extract was migrated to an upper end of the pesticide residue separation area with a developer, the sample extract was received by the pesticide enrichment area. At this time, the pesticide residue separation area was pulled out from the sample tank, laid flat, and air-dried for 1 min, so that the organic solvent could be volatilized completely and the pesticide residue was adsorbed to the pesticide enrichment area.

Step S4. 25 µL of an enzymatic aqueous phase working solution was added dropwise to the pesticide enrichment area (a piece of filter paper with an enzyme was also fixed in advance in the pesticide enrichment area); after 30 s, the substrate color development area was folded up so that the area overlapped with the pesticide enrichment area. Both areas were pinched tightly by hand for 1-3 min to perform color reaction. In case of no pesticide in the sample extract, color development occurs in the enzyme-catalyzed substrate color development area on the pesticide enrichment area, and a chromogenic product is absorbed by paper in the pesticide enrichment area; in case of a pesticide in the sample extract, the pesticide enriched in the pesticide enrichment area inhibits enzyme activity, insufficient or no color development occurs in the substrate color development area, and no chromogenic product is enriched in the paper in the pesticide enrichment area. Color changes can determine whether there is a pesticide in a sample.

After the reaction is completed, semi-quantitative analysis of specific pesticides can be performed by scanning on a scanner or smartphone photography and software analysis to determine whether the pesticide in the sample exceeds the standard.

Comparative Example 1

In order to illustrate that the method provided by the present disclosure has faster detection efficiency and higher accuracy than the conventional enzyme inhibition method, the conventional enzyme inhibition method and the method provided by the present disclosure are subjected to comparison test, and the test method is as follows:

The conventional enzyme inhibition method used enzyme inhibition reaction test paper for pesticide detection, which only contained an enzyme area and a substrate area. The test method was as follows:

Separately, 50 µL of PBS, 50 µL of pure methanol solution, and 50 µL of 0.05 mg/L N-methylcarbamate in methanol were added to the enzyme area of each of three pieces of conventional enzyme inhibition reaction test paper and incubated at 37° C. for 10 min; the enzyme areas and the substrate areas of the three pieces of enzyme inhibition reaction test paper were overlapped and contacted by folding, and pinched tightly by hand for 3 min to perform color reaction. The enzyme areas were separated from the substrate areas and the colors of the enzyme areas were observed. The enzyme area of the enzyme inhibition reaction test paper with PBS added dropwise was used as a reference substance, which was negative. Compared with the reference substance, the colors of the enzyme areas after adding 50 µL of pure methanol solution and 50 µL of 0.05 mg/L N-methylcarbamate in methanol became lighter, and the detection results were positive. This indicated that: the conventional enzyme inhibition reaction test paper was susceptible to the interference of organic solvents, it was impossible to effectively distinguish the level of pesticide concentration in the organic phase solution, and it was easy to produce false positive results during the detection, making it difficult to guarantee the accuracy of the detection results.

The detection was performed by using the method provided by the present disclosure, and the detection method was as follows:

Step S1. A TLC plate was cut into a rectangle, and one end of the rectangle was used to contact a sample extract to form a pesticide residue separation area; the other end of the rectangle was covered with a small piece cut from filter paper or glass fiber and fixed on a piece of enzyme inhibition reaction test paper to form a pesticide enrichment area; and a side of the enzyme inhibition reaction test paper away from the pesticide residue separation area was pasted with a piece of filter paper immobilized with a chromogenic agent to form a substrate color development area.

Step S2. 50 μL of PBS, 50 μL of pure methanol solution, and 50 μL of 0.05 mg/L N-methylcarbamate in methanol were added into three sample tanks, respectively. Three pesticide residue separation areas were each inserted into the three sample tanks for TLC separation and development.

Step S3. When the sample extract was migrated to an upper end of the pesticide residue separation area with a developer, the pesticide residue separation area was pulled out from the sample tank, laid flat, and air-dried for 1 min.

Step S4. 25 μL of an enzymatic aqueous phase working solution was added dropwise to the pesticide enrichment area; after 30 s, the substrate color development area was folded up so that the area overlapped with the pesticide enrichment area. Both areas were pinched tightly by hand for 3 min to perform color reaction.

The substrate color development area of the PBS group was used as a reference substance, which was negative. Compared with the reference substance, there was no color change in the substrate color development area of the pure methanol solution group, which was also negative. The color of the substrate color development area of the 0.05 mg/L N-methylcarbamate in methanol group became lighter, and the detection result was positive. This showed that the method provided by the present disclosure overcame the contradiction between organic solvent extraction and enzymatic reaction in aqueous solutions, improving the efficiency and accuracy of rapid detection of pesticide residues.

Comparative Example 2

The method provided by the present disclosure can reduce the interference of pigments and other substances in agricultural product samples and improve the accuracy of pesticide residue detection compared with an enzyme inhibition rapid detection card suitable for detecting pesticide residues in an organic solvent extraction sample, an independent sample introduction card and a use method thereof disclosed by the Chinese patent CN202010505846.6. In order to illustrate this problem, a comparison test was carried out. The detection method was as follows:

The independent sample introduction card disclosed by the Chinese patent CN202010505846.6 was used together with the conventional enzyme inhibition rapid detection card, and the detection method was as follows:

Separately, 50 μL of PBS, 50 μL of 0.05 mg/L N-methylcarbamate in methanol, and 50 μL of 0.05 mg/L N-methylcarbamate and 0.05 mg/L pigment (the pigment added in this detection was chlorophyll, but in practical application, the pigment in agricultural products includes but is not limited to chlorophyll) in methanol were added dropwise to sample introduction zones of three sample injection cards and placed at room temperature. After the moisture and organic solvents were completely volatilized, sample introduction zones were aligned with enzyme zones so that they were completely in contact with each other to trigger the enzyme inhibition reaction, followed by incubation at 37° C. for 10 min. After the incubation was completed, the contact between the sample injection zone and the enzyme zone was removed, and the enzyme zone and the substrate zone were completely overlapped and fitted in contact with each other by folding to trigger the enzymatic color reaction, which reacted at 37° C. for 3 min. The enzyme zones were separated from the substrate zones, and the colors of the enzyme zones were observed.

The enzyme zone of the PBS group was used as a reference substance, which was negative. Compared with the reference substance, the color of the enzyme zone of the 0.05 mg/L N-methylcarbamate in methanol group became lighter, and the detection result was positive. Compared with the reference substance, there was no significant color change in the enzyme zone of the 0.05 mg/L N-methylcarbamate and 0.05 mg/L pigment in methanol group, and the detection result was negative. This showed that in the presence of interfering substances such as pigments, this detection method is prone to false positive results during the detection and it is difficult to guarantee the accuracy of the detection results.

The detection was performed by using the method provided by the present disclosure, and the detection method was as follows:

Step S1. A TLC plate was cut into a rectangle, and one end of the rectangle was used to contact a sample extract to form a pesticide residue separation area; the other end of the rectangle was covered with a small piece cut from filter paper or glass fiber and fixed on a piece of enzyme inhibition reaction test paper to form a pesticide enrichment area; and a side of the enzyme inhibition reaction test paper away from the pesticide residue separation area was pasted with a piece of filter paper immobilized with a chromogenic agent to form a substrate color development area.

Step S2. 50 μL of PBS, 50 μL of 0.05 mg/L N-methylcarbamate in methanol, and 50 μL of 0.05 mg/L N-methylcarbamate and 0.05 mg/L pigment in methanol were added into three sample tanks, respectively. Three pesticide residue separation areas were each inserted into the three sample tanks for TLC separation and development.

Step S3. When the sample extract was migrated to an upper end of the pesticide residue separation area with a developer, the pesticide residue separation area was pulled out from the sample tank, laid flat, and air-dried for 1 min.

Step S4. 25 μL of an enzymatic aqueous phase working solution was added dropwise to the pesticide enrichment area; after 30 s, the substrate color development area was folded up so that the area overlapped with the pesticide enrichment area. Both areas were pinched tightly by hand for 3 min to perform color reaction.

Figure 2:
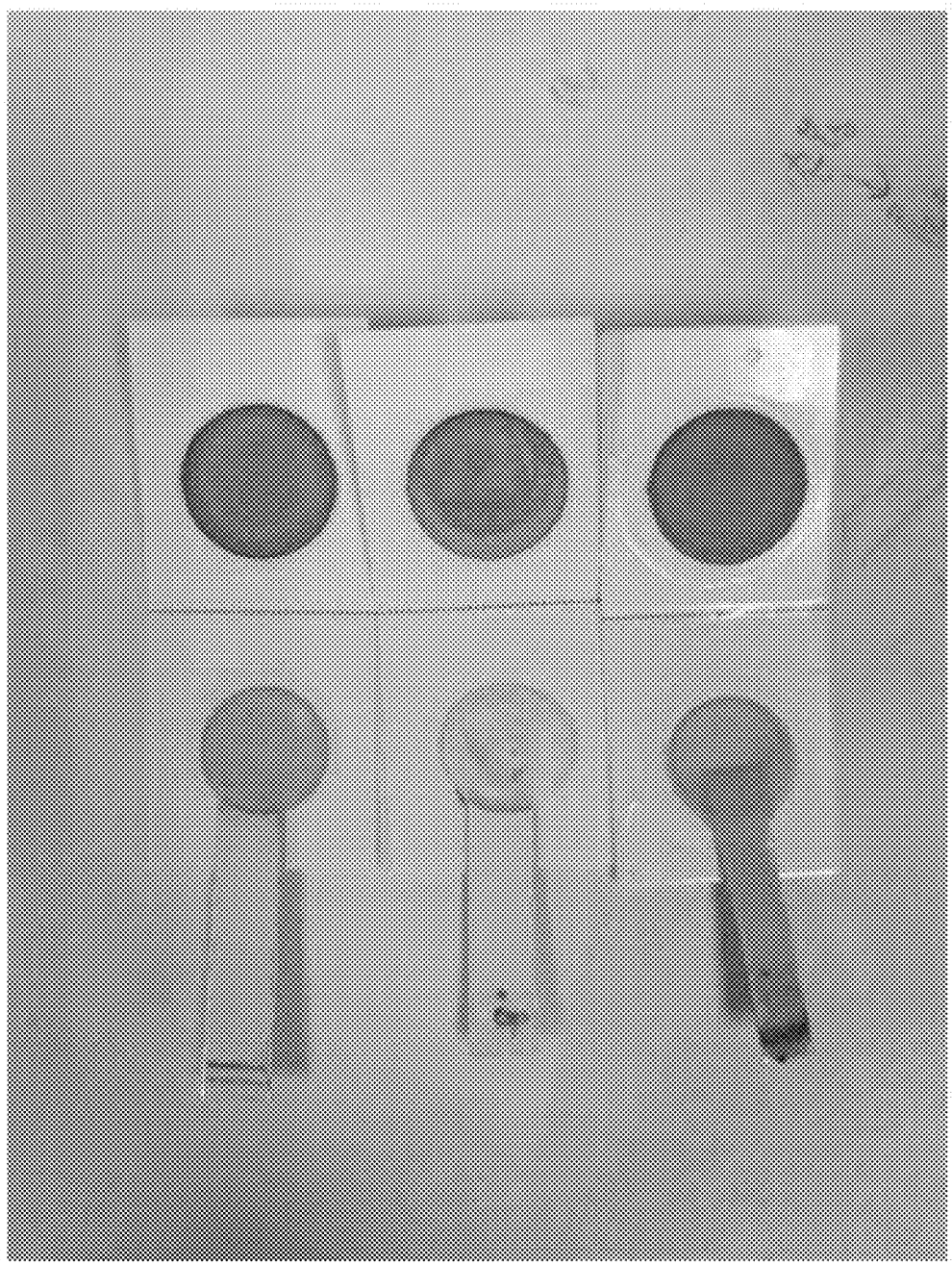
FIG. 2 is a schematic diagram of detection results of comparative example 2 of a method provided by the present disclosure, from left to right, showing a 50 µL PBS group, 50 µL 0.05 mg/L N-methylcarbamate in methanol group, and a 50 µL 0.05 mg/L N-methylcarbamate and 0.05 mg/L pigment in methanol group.

With reference to FIG. 2, the substrate color development area of the PBS group was used as a reference substance, which was negative. Compared with the reference substance, the colors of the substrate color development areas of the 0.05 mg/L N-methylcarbamate in methanol group and the 0.05 mg/L N-methylcarbamate and 0.05 mg/L pigment in methanol group became lighter, and the detection results were positive. This showed that the method provided by the present disclosure could reduce the interference of substances such as pigments in agricultural product samples and improve the accuracy of pesticide residue detection.

Since the distribution ratio of organophosphorus and carbamate pesticides in the organic phase is relatively large, while the distribution ratio of pigments such as chlorophyll is relatively small, the effective separation of pesticides and interfering substances such as pigments in the sample matrix can be achieved by the method provided by the present disclosure. The method overcomes a contradiction between organic solvent extraction and enzymatic reaction in an aqueous solution, reduces the interference of pigments and other substances in agricultural product samples, and improves the efficiency and accuracy of rapid detection of pesticide residues.

It will be apparent to those skilled in the art that the present disclosure is not limited to the details of the exemplary embodiments described above, but that the present disclosure can be embodied in other specific forms without departing from the spirit or essential characteristics of the present disclosure. Accordingly, the embodiments should be regarded in all points of view as exemplary and not restrictive, the scope of the present disclosure being defined by the appended claims rather than the foregoing description, and it is therefore intended that all changes falling within the meaning and scope of equivalent elements of the claims should be included in the present disclosure.

In addition, it should be understood that although this specification is described in accordance with the implementations, not each implementation only contains an independent technical solution, and this description in the specification is only for clarity. Those skilled in the art should take the specification as a whole. The technical solutions in the embodiments can also be properly combined to form other implementations that can be understood by those skilled in the art.

What is claimed is:

1. A method for rapidly detecting pesticides based on thin-layer chromatography (TLC) and enzyme inhibition principles, comprising the following steps:

step S1, cutting a TLC plate into a rectangle, and using one end of the rectangle to contact a sample extract to form a pesticide residue separation area; covering the other end of the rectangle with a small piece cut from filter paper or glass fiber and fixing on a piece of enzyme inhibition reaction test paper to form a pesticide enrichment area; and pasting a side of the enzyme inhibition reaction test paper away from the pesticide residue separation area with a piece of filter paper immobilized with a chromogenic agent to form a substrate color development area;

step S2, adding 50 µL of an agricultural product sample extract into a sample tank, and inserting the pesticide residue separation area into the sample tank to perform TLC separation and development;

step S3, migrating the sample extract to an upper end of the pesticide residue separation area with a developer, pulling out the pesticide residue separation area from the sample tank, laying the pesticide residue separation area flat, and air-drying the pesticide residue separation area for 1 min; and step S4, adding 25 µL of an enzymatic aqueous phase working solution dropwise to the pesticide enrichment area; after 30 s, folding the substrate color development area so that the substrate color development area overlaps with the pesticide enrichment area, pinching both areas tightly by hand for 1-3 min to perform color reaction, wherein in case of no pesticide in the sample extract, color development occurs in the substrate color development area, and a chromogenic product is absorbed by paper in the pesticide enrichment area; in case of a pesticide in the sample extract, insufficient or no color development occurs in the substrate color development area, and no chromogenic product is enriched in the paper in the pesticide enrichment area, so that color changes can determine whether there is a pesticide in a sample.

2. The method for rapidly detecting pesticides based on TLC and enzyme inhibition principles according to claim 1, wherein in step S1, a supporting medium of the TLC plate is selected from the group consisting of glass and metal foil.

3. The method for rapidly detecting pesticides based on TLC and enzyme inhibition principles according to claim 1, wherein in step S2, the sample extract is prepared by a quick, easy, cheap, effective, rugged and safe (QuEChERS) method, using acetonitrile or methanol as a solvent.

* * * * *